United States Patent
Lyons et al.

(10) Patent No.: US 10,850,864 B2
(45) Date of Patent: *Dec. 1, 2020

(54) ELECTRONIC AVIONICS SYSTEMS AND METHODS

(71) Applicant: Aspen Avionics, Inc., Albuquerque, NM (US)

(72) Inventors: Peter Lyons, Albuquerque, NM (US); Jeffrey D. Bethel, Albuquerque, MN (US)

(73) Assignee: Aspen Avionics, Inc., Albuquerque, NM (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/215,132

(22) Filed: Dec. 10, 2018

(65) Prior Publication Data

US 2019/0112068 A1    Apr. 18, 2019

Related U.S. Application Data

(60) Division of application No. 15/437,315, filed on Feb. 20, 2017, now Pat. No. 10,150,572, which is a
(Continued)

(51) Int. Cl.
*G08B 23/00* (2006.01)
*B64D 43/00* (2006.01)
(Continued)

(52) U.S. Cl.
CPC ............. *B64D 43/00* (2013.01); *B64D 45/00* (2013.01); *G01C 23/00* (2013.01); *G07C 5/0808* (2013.01); *G07C 5/0816* (2013.01)

(58) Field of Classification Search
CPC ....... B64D 45/00; G07C 5/0808; G01C 23/00
(Continued)

(56) References Cited

U.S. PATENT DOCUMENTS

| | | |
|---|---|---|
| 5,450,323 A | 9/1995 | Maupillier et al. |
| 5,475,594 A | 12/1995 | Oder et al. |

(Continued)

FOREIGN PATENT DOCUMENTS

| | | |
|---|---|---|
| CN | 1278941 A | 1/2001 |
| CN | 101044513 A | 9/2007 |

(Continued)

OTHER PUBLICATIONS

Notice of Allowance Received for U.S. Appl. No. 15/013,908, dated Sep. 5, 2019, 24 pages.

(Continued)

*Primary Examiner* — Tai T Nguyen
(74) *Attorney, Agent, or Firm* — Kutak Rock LLP

(57) ABSTRACT

The present general inventive concept relates to a system of method having an electronic flight display that meets the FAR 23.1311(b) regulatory requirement for redundant backup instruments in the cockpit. The present general inventive concept also provides a system and method to detect failures, obstructions, or improper operation of the aircraft pitot pressure sensing system using a combination of dissimilar sensor data that is independent from each other, e.g., allocated from different sources and employed for different purposes on different displays, and displays information on an avionics display screen.

14 Claims, 1 Drawing Sheet

Related U.S. Application Data continuation of application No. 13/960,138, filed on Aug. 6, 2013, now Pat. No. 9,573,699, which is a division of application No. 12/843,875, filed on Jul. 26, 2010, now Pat. No. 8,502,702.

(60) Provisional application No. 61/367,041, filed on Jul. 23, 2010, provisional application No. 61/367,058, filed on Jul. 23, 2010, provisional application No. 61/228,603, filed on Jul. 26, 2009, provisional application No. 61/228,610, filed on Jul. 26, 2009.

(51) Int. Cl.
*G01C 23/00* (2006.01)
*B64D 45/00* (2006.01)
*G07C 5/08* (2006.01)

(58) Field of Classification Search
USPC .... 340/970–975, 945, 963, 967, 977; 701/1, 701/4
See application file for complete search history.

(56) References Cited

U.S. PATENT DOCUMENTS

| | | | |
|---|---|---|---|
| 5,978,715 A | 11/1999 | Briffe et al. | |
| 6,020,832 A | 2/2000 | Jensen | |
| 6,038,498 A | 3/2000 | Briffe et al. | |
| 6,148,179 A | 11/2000 | Wright et al. | |
| 6,154,151 A | 11/2000 | McElreath et al. | |
| 6,181,900 B1 | 1/2001 | Lee et al. | |
| 6,181,990 B1 | 1/2001 | Grabowsky | |
| 6,199,008 B1 | 3/2001 | Aratow et al. | |
| 6,281,895 B1 | 8/2001 | Jeong | |
| 6,285,298 B1 | 9/2001 | Gordan | |
| 6,298,286 B1* | 10/2001 | Ying | B64D 43/00 244/1 R |
| 6,320,579 B1 | 11/2001 | Snyder et al. | |
| 6,381,519 B1 | 4/2002 | Snyder | |
| 6,842,122 B1 | 1/2005 | Langner et al. | |
| 7,191,406 B1 | 3/2007 | Barber et al. | |
| 7,307,549 B2 | 12/2007 | Firra | |
| 7,460,029 B2 | 2/2008 | Boorman et al. | |
| 7,379,796 B2 | 5/2008 | Walsdorf et al. | |
| 7,834,779 B2 | 11/2010 | He et al. | |
| 8,139,025 B1 | 3/2012 | Krenz | |
| 8,264,376 B1 | 9/2012 | McLoughlin et al. | |
| 8,502,702 B2 | 8/2013 | Lyons et al. | |
| 8,643,508 B2 | 2/2014 | Turner | |
| 8,749,594 B2 | 6/2014 | Kyriakos et al. | |
| 9,285,217 B2 | 3/2016 | Lyons et al. | |
| 9,573,699 B2 | 2/2017 | Lyons et al. | |
| 9,694,631 B2 | 7/2017 | Tsuchikawa et al. | |
| 10,150,572 B2 | 12/2018 | Lyons et al. | |
| 2002/0077921 A1 | 6/2002 | Morrison et al. | |
| 2003/0105579 A1 | 6/2003 | Walter | |
| 2003/0130791 A1* | 7/2003 | McIntyre | G05D 1/0077 701/472 |
| 2003/0214242 A1 | 11/2003 | Berg-Johansen | |
| 2005/0098681 A1 | 5/2005 | Berson et al. | |
| 2005/0190142 A1 | 9/2005 | Ferguson | |
| 2005/0192717 A1* | 9/2005 | Tafs | G07C 5/085 701/3 |
| 2006/0022993 A1 | 2/2006 | Hammond | |
| 2006/0244636 A1 | 11/2006 | Rye et al. | |
| 2006/0244655 A1 | 11/2006 | Dorneich et al. | |
| 2007/0067074 A1 | 3/2007 | Lykken et al. | |
| 2008/0184166 A1 | 7/2008 | Getson | |
| 2010/0211237 A1 | 8/2010 | Nichols et al. | |
| 2011/0148749 A1 | 6/2011 | Kyriakos et al. | |
| 2012/0001773 A1 | 1/2012 | Lyons et al. | |
| 2012/0001774 A1 | 1/2012 | Lyons et al. | |
| 2012/0136591 A1 | 5/2012 | LeMense et al. | |
| 2013/0314258 A1 | 11/2013 | Lyons et al. | |
| 2014/0277856 A1 | 9/2014 | Lyons et al. | |
| 2016/0161282 A1 | 6/2016 | Lyons et al. | |
| 2017/0158346 A1 | 6/2017 | Lyons et al. | |
| 2017/0326927 A1 | 11/2017 | Bill et al. | |

FOREIGN PATENT DOCUMENTS

| | | |
|---|---|---|
| CN | 101258455 A | 9/2008 |
| CN | 101382968 A | 3/2009 |
| CN | 105222805 A | 1/2016 |
| CN | 105222805 B | 10/2018 |
| CN | 109186629 A | 1/2019 |
| EP | 2048477 A2 | 4/2009 |
| EP | 2460351 A2 | 6/2012 |
| EP | 2460351 B1 | 9/2019 |
| WO | 9915404 A2 | 4/1999 |
| WO | 2008119955 A1 | 10/2008 |
| WO | 2011/017063 A2 | 2/2011 |
| WO | 2011/017063 A3 | 2/2011 |

OTHER PUBLICATIONS

Aeronautical Computing Technique, Nov. 2006 (1 pg), vol. 36 No. 6.
Communication pursuant to Article 94(3) EPC received for European Application No. 10806870.1, dated Jun. 14, 2017, 10 pages.
Communication Pursuant to Rule 164(1) EPC received for European Patent Application Serial No. 10806870.1 dated Dec. 23, 2014, 07 pages.
Communication Pursuant to Rules 70(2)and 70a(2) EPC Received for European Application No. 10806870.1, dated May 12, 2015.
Communication under Rule 71(3) received for EP Application No. 10806870.1 dated 01 Mar. 1, 2019, 8 pages.
Extended European Search Report received for European Application No. 10806870.1, dated Apr. 23, 2015.
Final Office Action Received for U.S. Appl. No. 12/843,683, dated Aug. 8, 2013, 9 pages.
Final Office Action Received for U.S. Appl. No. 15/437,315, dated Apr. 9, 2018, 7 pages.
Final Office Action received for U.S. Appl. No. 14/158,545 dated Mar. 24, 2015, 8 pages.
First Office Action and English Translation thereof issued by the State Intellectual Property Office (SIPO) of China dated Jul. 1, 2014 in connection with corresponding Chinese Patent Application No. 201080042826.4, 11 pages.
First Office Action and English Translation thereof issued by the State Intellectual Property Office (SIPO) of China dated Sep. 20, 2017 in connection with corresponding Chinese Patent Application No. 201510612227.6, 14 pages.
International Preliminary Report on Patentability and Written Opinion Received for PCT Application No. PCT/US2010/043285, dated Jan. 31, 2012, 7 pages.
International Search Report and Written Opinion received for PCT Application No. PCT/US2010/043285, dated Jan. 14, 2011, 10 pages.
Non Final Office Action received for U.S. Appl. No. 15/013,908, dated Jul. 9, 2018, 10 pages.
Non Final Office Action Received for U.S. Appl. No. 15/437,315, dated Aug. 24, 2017, 5 pages.
Non-Final Office Action received for U.S. Appl. No. 12/843,683, dated Dec. 10, 2012, 8 pages.
Non-Final Office Action received for U.S. Appl. No. 12/843,867, dated Jan. 22, 2013, 9 pages.
Non-Final Office Action received for U.S. Appl. No. 13/960,138, dated Jun. 25, 2015, 6 pages.
Non-Final Office Action received for U.S. Appl. No. 13/960,138, dated Mar. 22, 2016, 8 pages.
Non-Final Office Action received for U.S. Appl. No. 14/158,545 dated Dec. 4, 2014, 8 pages.
Notice of Allowance received for U.S. Appl. No. 12/843,683, dated Feb. 3, 2014, 5 pages.
Notice of Allowance received for U.S. Appl. No. 12/843,875, dated Apr. 8, 2013, 9 pages.

(56) References Cited

OTHER PUBLICATIONS

Notice of Allowance received for U.S. Appl. No. 12/843,867, dated Sep. 25, 2013, 8 pages.
Notice of Allowance received for U.S. Appl. No. 13/960,138, dated Jun. 17, 2014, 9 pages.
Notice of Allowance received for U.S. Appl. No. 13/960,138, dated Oct. 29, 2014, 2 pages.
Notice of Allowance received for U.S. Appl. No. 15/437,315, dated Aug. 3, 2018, 8 pages.
Notice of Allowance received for U.S. Appl. No. 14/158,545 dated Nov. 2, 2015, 8 pages.
Notification of Grant of Patent and English Translation thereof issued by the State Intellectual Property Office (SIPO) of China dated Jul. 8, 2015 in connection with corresponding Chinese Patent Application No. 201080042826.4, 3 pages.
Notification of Grant received for Chinese Patent Application Serial No. 201510612227.6 dated Jul. 2, 2018, 4 pages.
Second Office Action and English Translation thereof issued by the State Intellectual Property Office (SIPO) of China dated Feb. 2, 2015 in connection with corresponding Chinese Patent Application No. 201080042826.4, 14 pages.
Notice of Allowance received for U.S. Appl. No. 13/960,138, dated Oct. 4, 2016, 12 pages.
Final Office Action received for U.S. Appl. No. 15/013,908, dated Feb. 19, 2019, 7 pages.
"Notice of Allowance Received for U.S. Appl. No. 15/013,908, dated Dec. 17, 2019, 8 pages", 8.

* cited by examiner

ELECTRONIC AVIONICS SYSTEMS AND METHODS

CROSS-REFERENCE TO RELATED APPLICATIONS

This application is a divisional application of U.S. patent application Ser. No. 15/437,315, filed Feb. 20, 2017, now U.S. Pat. No. 10,150,572, which is a continuation application of U.S. patent application Ser. No. 13/960,138, filed Aug. 6, 2016, now U.S. Pat. No. 9,573,699, which is a divisional application of U.S. patent application Ser. No. 12/843,875, filed Jul. 26, 2010, now U.S. Pat. No. 8,502,702, which claims priority pursuant to 35 U.S.C. 119(e) to U.S. Provisional Patent Application Ser. Nos. 61/228,610, filed Jul. 26, 2009 and entitled "Reversionary Architecture System and Method," 61/228,603, filed Jul. 26, 2009 and entitled "Pitot Pressure Sensing System and Method," 61/367,041, filed Jul. 23, 2010 and entitled "Avionics Display," and 61/367,058, filed Jul. 23, 2010 and entitled "Avionics Display," the entire disclosures of which are herein incorporated by reference.

FIELD OF THE INVENTION

The present general inventive concept relates to electronic avionics systems and methods, more particularly, the present general inventive concept relates to systems and methods to detect and/or provide backup in the event of failures, obstructions, or improper operation of an aircraft pitot pressure sensing system or other failures of instruments. In one embodiment, the present general inventive concept relates to a unique electronic flight display architecture that meets the FAR 23.1311(b) regulatory requirement for redundant backup instruments in the cockpit. In another embodiment the general inventive concept uses a combination of dissimilar sensor data and displays information to an avionics display.

BACKGROUND

The FAA Advisory Circular 23.1311-1B sets forth acceptable means of showing compliance with 14 CFR § 23 for installing electronic displays in part 23 airplanes. Among other things, it requires a reversionary or backup architecture for electronic primary flight displays, or an equivalent level of safety.

Pitot pressure and ambient static pressure are used to determine aircraft indicated airspeed, which is a critical performance determinant of the aircraft and which is also often used to schedule the performance or operation of various aircraft systems, e.g., trim motors, artificial feel systems, envelope protection systems, or may be used in the computation of other flight parameters, e.g., attitude information from an Air Data Attitude Heading Reference System (ADAHRS).

Where failure of the pitot system is a critical failure, conventional aircraft design implements a pitot sensing architecture with sufficient redundancy to assure availability of reliable data. Examples of such redundancy architectures are dual redundant pitot probes with dual redundant and monitored heating elements, with each probe heater connected to a different power generation source. In many legacy light aircraft, the installed pitot system does not possess sufficient redundancy to assure availability of the accurate data, which can result in use of misleading data and/or which generally precludes the use of data in performing critical functions, and retrofitting such legacy aircraft with redundant pitot systems is extremely difficult and costly.

SUMMARY

The present general inventive concept relates to a system of method having an electronic flight display that meets the FAR 23.1311(b) regulatory requirement for redundant backup instruments in the cockpit. The present general inventive concept also relates to a system and method to detect failures, obstructions, or improper operation of the aircraft pitot pressure sensing system using a combination of dissimilar sensor data.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

The present general inventive concept provides systems and methods that relate to a reversionary or backup architecture for electronic primary flight displays, or an equivalent level of safety.

Figure 1:
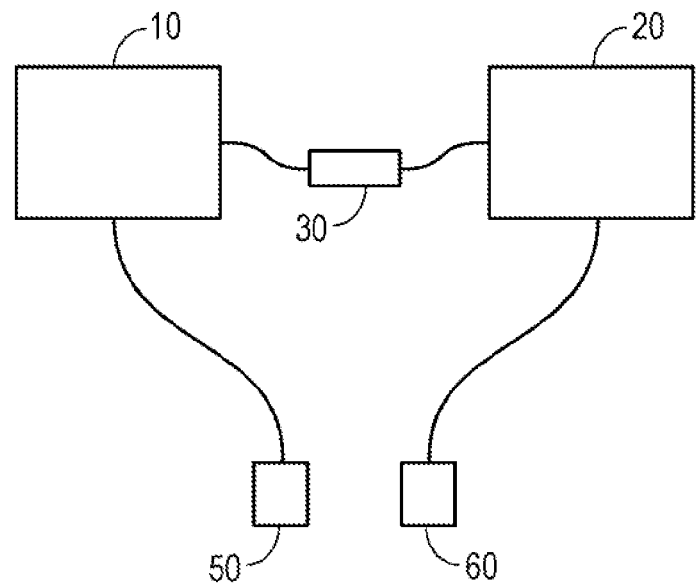
FIG. 1 is an exemplary embodiment of the present general inventive concept.

Referring to FIG. 1, the present general inventive concept provides a system having two electronic displays 10, 20 that operate identical hardware and software and where the function of the display can be configured at installation, and where each display has both an integral air data computer and an attitude heading reference computer ("attitude computer"), or is connected to external air data and attitude computer(s). Preferably, one of the two displays 10, 20 is configured as a primary flight display and the other is configured as a Multi Function Display (MFD). For example, the electronic avionics display might include the Electronic Flight Data Display Instrument disclosed in U.S. patent application Ser. No. 11/773,419, the entire disclosure of which is herein incorporated by reference. It will be appreciated that the air data computer and attitude heading reference computer for each display may be integrated together into each separate display, or may be separate independent computers utilized by each display. Furthermore, it will be appreciated that a single computer processor may be utilized for each display that performs the functions of both computers, and or other processor functions that may be necessary for operation of said display. Other independent computers, processors or other hardware (independent for each processor) may be utilized in combination with separate air data and attitude computers for performing other functions of each display. Furthermore, in some embodiments, the air data computer and the attitude computer of each display comprise sub-routines or functions performed by a single processor.

When configured as a primary flight display, the present general inventive concept has a single operating mode. When configured as a Multi Function Display, the present general inventive concept has at least two operating modes, one of which is as a Primary Flight Display accessible either via a single pilot action or via automatic transition.

The two displays 10, 20 intercommunicate with one another via a communications connection 30 to share essential information, such as pilot settings and unit health, or other data or information that may be determined or obtained by one display and usable by the other display. This connection may be by a wired or wireless data communication, and may use industry standard interfaces such as RS232, ARINC 429, USB, Ethernet, Bluetooth, 802.11, etc. Data exchange can include, but is not limited to, items such as unit heath, failures, pilot configured display settings, heartbeat, etc. The displays 10, 20 installed in the aircraft allow the removal of redundant mechanical instruments typically required by regulation. The MFD display that provides the backup capability need not continuously display primary flight information so long as that information remains accessible via a single pilot action.

Each display 10, 20 is powered by a power source 50, 60 independent from the other. For example, a first display 10 is configured as a PFD and is powered by a first power source 50 and a second display 20 is configured as a MFD (with reversionary PFD backup capability) and is powered by a second power source 60, and the first power source 50 is independent of the second power source 60. In one embodiment, this is accomplished using a dedicated external battery 50, 60 that is charged by a display head. In a second embodiment, this would be accomplished using a different aircraft alternator or generator powering a different electrical bus. In yet a third embodiment, this may be accomplished by operating from an emergency bus and battery powered by a single alternator or generator that can be isolated from the aircraft primary bus.

The independent power sources, and other hardware (i.e. air data computer and attitude computer) for each display, allows the displays to operate independent of one another, such that neither display depends upon the other display to perform critical functions. If one display goes out, the other one is unaffected. Notwithstanding, it will be appreciated that information/data and/or other resources may be shared between both displays when both displays are functioning properly. If the attitude and heading reference system of one of the displays fails, the other attitude and heading reference system of the other display is unaffected. In some embodiments, if the attitude and heading reference system of the MFD fails, the MFD can use heading data for non-critical functions from the PFD. In some such embodiments, if the attitude and reference heading system of the PFD fails, the MFD will go into reversionary mode.

In some embodiments, the present general inventive concept includes an input device to change the configuration of the display from a MFD to a PFD. For example, the input device could be a dedicated button or a hot key button. In this manner, a single pilot action, pressing the button, would provide immediate reversion to the PFD, thus satisfying FAA requirements.

In some embodiments, the communications connection 30 communicates the status of each display (or is used to transmit the status of each display or detect the absence of a status message from one display to another display). In the event that the PFD fails, information from the PFD is communicated (or information that is communicated to confirm proper function ceases to communicate) via the communications connection 30 to the MFD which uses such information, or lack of information to make a determination to automatically revert to the PFD configuration (if the MFD is programmed to do so). In some embodiments, the MFD and PFD include identical software in which configuration software for each device tells or instruction the device on boot up to operate either as an MFD or a PFD, and if as an MFD whether to operate with or without a reversion mode. In preferred devices in which the MFD may revert to a PFD (either automatically, or manually), upon reversion, the MFD become a mirror of the PFD display and in how in interfaces with other equipment on the airplane.

In one configuration, where the multi-function display requires pilot action to switch to a primary flight display, a third independent attitude instrument may be retained to ensure that information needed for safe operation is available without pilot action. This configuration offers the advantage of providing relief from the regulatory requirement to configure the multifunction display as a primary flight display prior to entering critical phases of flight, thereby allowing the multifunction display to continue to operate as such during those flight phases.

In another configuration where the multi-function display can automatically switch to a primary flight display after detecting a failure of the display configured as a primary flight display then a third independent attitude instrument is not installed.

In yet another configuration a third independent attitude indicator is not required and a pilot action is required to switch the multifunction display to a primary flight display. In each configuration the redundant airspeed and altitude instruments typically required by the regulation is not installed.

The exemplary embodiment of the present general inventive concept is implemented as a software algorithm, e.g., computer readable codes, on a computer readable medium such as firmware of an electronic avionics display, such as the electronic avionics devices shown and described in U.S. Provisional Patent Application Ser. No. 61/367,041, entitled "Avionics Display", filed Jul. 23, 2010, or U.S. Provisional Patent Application Ser. No. 61/367,058, entitled "Avionics Display", filed Jul. 23, 2010 (the entire disclosures of which are incorporated herein by reference). For instance, a setup procedure may be stored in a database such that, upon request by a user, the setup requests information permits a user to assign a function to the displays 10, 20. Depending on the inputted data, the present general inventive concept will assign a function to one or both of the displays 10, 20.

To assure the integrity of the system, adequate redundancy, and reliability of the flight data used, some embodiments of the present inventive concept are operably connected to two pitot pressure systems, each operating independent of the other, thus assuring at least one reliable source of pitot pressure system data in the event of a single pitot system failure. In other embodiments of the present inventive concept, flight data displayed on one or both of the displays 10, 20 is derived from a single pitot pressure system, thus calling into question the integrity of the system and the flight data relied upon therein. For embodiments employing a single pitot pressure system, the variations and sub-combinations of the present general inventive concept described below are recommended to provide adequate redundancy and backup. Nevertheless, it will be appreciated that some embodiments employing a single pitot pressure system will utilize the variations and sub-combinations of the present general inventive concept described above with respect to FIG. 1 without utilizing the variations and sub-combinations of the present general inventive concept described below with respect to FIG. 2.

The present general inventive concept provides systems and methods whereby obstruction or failures of an unreliable aircraft pitot pressure sensing system (including pitot tube or static pressure tube) is detected, using independent dissimilar information, and corrected, enabling the use of aircraft pitot information to perform critical flight functions. The present general inventive concept employs multiple dissimilar sensor inputs to compute critical flight parameters or schedule the performance or operation of critical flight systems. One example of a critical function performed in a light aircraft is the computation and display of aircraft attitude.

Modern certification rules pertaining to electronic flight displays require that at least two sources of attitude information be installed such that one reliable display of attitude data remain available following any single failure in the aircraft, and that a single failure can not present simultaneous misleading data on more than one display.

Modern low cost attitude heading reference systems employ a mathematical process by which attitude is derived using a combination of low cost sensor data, including information from an aircraft pitot sensor. To install more than one such attitude sensing platform requires that a means be implemented to ensure that no single failure can result in either the loss of all attitude data, or present misleading data on more than one display.

In the case of pitot data, most light aircraft only include a single pitot system, as it is cost prohibitive to add a second pitot system. Larger aircraft that rely on pitot data for critical systems will typically be certified with two, or three, independent pitot systems, adding cost and complexity to their designs, which can be more easily absorbed in the overall costs associated with such larger aircraft. In single-pitot systems, ensuring that a single failure does not result in loss of attitude data, or presenting misleading data requires a means be developed to detect critical failures of the single-pitot sensing system, such as may occur in flight due to an inadvertent encounter with in-flight icing conditions.

The present general inventive concept compares information from a device that measures the aircraft ground speed, such as a GPS receiver (or Inertial Navigation System, Doppler radar system, or similar). The aircraft ground speed is compared to and correlated with the pitot pressure and/or air-speed to determine if the pitot pressure (or static pressure of the pitot system) has been corrupted. When the monitor determines that the pitot (or static) pressure is corrupted, downstream critical systems that rely on correct pitot pressure are advised of the potentially corrupted data so that they can, as appropriate, be flagged as invalid or transition into a fail-safe operating mode.

The present general inventive concept compares groundspeed to the computed indicated airspeed to determine if the aircraft is airborne according to one data type, yet not airborne according to the other data type. Under these circumstances the pitot data is flagged as invalid as previously described.

For example, in the case of a multiple ADAHRS architecture where the attitude solution is dependent on reliable airspeed data input, a sensed failure or degradation of the pitot input can be, and in certain embodiments is, used to flag the attitude solution as invalid or "fail-hard." In this manner, two displays of misleading attitude are not simultaneously presented to the pilot.

In another embodiment, the attitude solution is capable of transitioning to an alternate aiding source, such as substituting the critical airspeed input with a surrogate for airspeed, such as independently derived aircraft groundspeed, i.e., "fail-soft."

Yet another embodiment substitutes a fixed airspeed input into the ADAHARS solution as a surrogate for actual airspeed. In this case, the fixed airspeed value is selected in such a manner to ensure that any degradation of attitude system performance was not unsafe, e.g., "fail-fixed," "fail-safe."

Other embodiments of the invention may be used to detect and mitigate the effect of a failed airspeed input to other critical flight systems, for example envelope protection systems (e.g., stick shaker, pusher, rudder boost, etc.) artificial feel systems, flap actuator scheduling systems, trim actuator scheduling systems, autopilot gain scheduling systems, and/or FADEC control scheduling systems.

Figure 2:
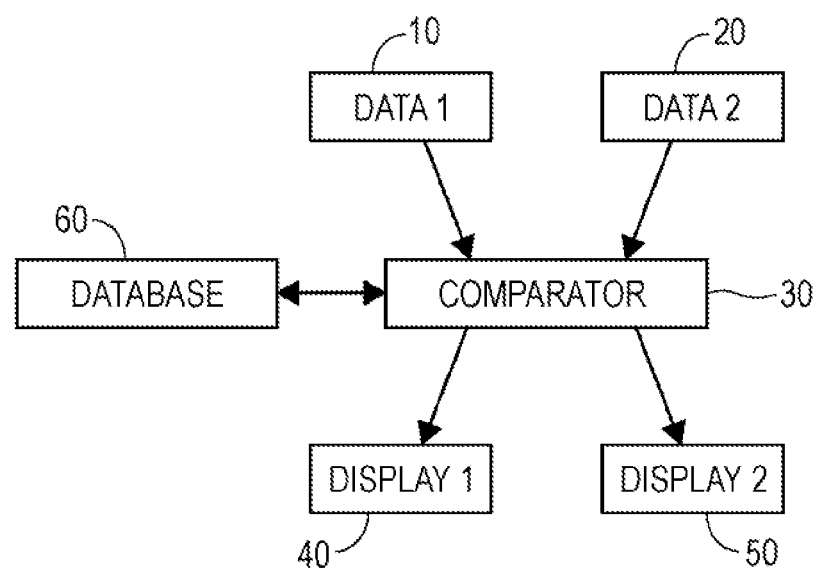
FIG. 2 is a flowchart of an exemplary embodiment of the present general inventive concept.

In use, as illustrated in FIG. 2, a first data 10 and a second data 20 that is dissimilar from the first data 10 is transmitted to a comparator 30. In one embodiment, all data goes through the comparator 30 before being used by critical systems. In such an embodiment, all critical systems are downstream of the comparator. In another embodiment, data is fed to the critical systems and comparator 30 in parallel.

The comparator 30 is connected to database 60 such that first data 10 and second data 20 can be categorized and compared against each other and ideal data, which is stored in the database 60. The comparator 30 compares the first data 10 to the second data 20 to determine whether either the first data 10 or the second data 20 is corrupt. If one of the first data 10 or the second data 20 is corrupt, the comparator may alter the corrupt data, provide a notification to a user that the data may be corrupt, or cause the other systems that use the data to enter in a fail-hard, fail safe or fail-fixed state. For example, in some embodiments in which all data goes through the comparator prior to being provided to critical systems, the comparator will alter the corrupt data. In other embodiments in which data is provided to comparator 30 and the critical systems in parallel, the comparator will cause the systems that use the data to enter in a fail-hard, fail safe or fail-fixed state (i.e. the comparator takes action to mitigate the effect of failed airspeed input). It is foreseen that the notification may be displayed on either a first display 40 or second display 50.

It will be appreciated that the general inventive concept, as described herein, may be, and in certain embodiments is, used in conjunction with any or all of the general inventive concepts described in U.S. Provisional Patent Application Ser. Nos. 61/228,608, entitled "Information Page Selection System and Method", 61/228,599, entitled "Altitude Marker System and Method", 61/228,598, entitled "Multifunction Avionics Display User Interface Method", 61/228,597, entitled "Dynamic Topography Resolution System and Method of Display", 61/228,601, entitled "LCD Display Dimming System and Method", filed Jul. 26, 2009, all five filed on Jul. 26, 2009, the entire disclosures of which are herein incorporated by reference, and also U.S. Provisional Patent Application Ser. Nos. 61/367,041, entitled "Avionics Display", filed Jul. 23, 2010, and 61/367,058, entitled "Avionics Display", both filed Jul. 23, 2010, the entire disclosures of which are herein incorporated by reference.

The exemplary embodiments of the present general inventive concept are implemented as a software algorithm, e.g., computer readable codes, on a computer readable medium. Various other embodiments of the present general inventive concept can be embodied as computer readable codes on a computer readable medium and/or computer readable recording medium (collectively "computer readable recording medium" hereafter). The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software.

Thus, while the present general inventive concept has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

It is also to be understood that the following claims are intended to cover all of the generic and specific features of the invention herein described, and all statements of the scope of the invention which, as a matter of language, might be said to fall therebetween. Hence, the proper scope of the present general inventive concept should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. An electronic avionics system comprising:
    a first avionics display operably connected with a first air data computer and a first attitude computer;
    a second avionics display operably connected with a second air data computer and a second attitude computer; and
    a communications connection linking said first and second avionics displays;
    wherein information is transmitted between said first and second avionics displays via said communications connection.

2. The electronic avionics system of claim 1, wherein said first avionics display is integrated with said first air data computer and said first attitude computer.

3. The electronic avionics system of claim 1, wherein said first air data computer and said first attitude computer is a single processor.

4. The electronic avionics system of claim 1, wherein said first air data computer, said first attitude computer and a computer of said first display are sub-routines performed by a single processor.

5. The electronic avionics system of claim 1, wherein said information comprises essential information regarding pilot settings or unit health.

6. The electronic avionics system of claim 1, wherein said first display is connected to a first power source and said second display is connected to a second power source, the first power source being independent from the second power source.

7. The electronic avionics system of claim 1, wherein one of said first or second displays is configured as a multi-function flight display and includes an input device, the input device being capable of reconfiguring the one of said first or second displays to a primary flight display upon receipt of predetermined input to the input device.

8. The electronic avionics system of claim 7, wherein said input device is a dedicated button on the display and said predetermined input is pressing the button.

9. The electronic avionics system of claim 1, further comprising a third display that operates independent of said first and second displays to display attitude information.

10. The electronic avionics system of claim 1, wherein said first display is configured as a multi-function flight display and changes its configuration to a primary flight display automatically upon receipt of or absence of predetermined information from said second display via the communications connection.

11. The electronic avionics system of claim 10, wherein said predetermined information is detection of a failure of said second display.

12. An electronic avionics system comprising:
    a first avionics display that is configured to operate as a primary flight display during flight operations;
    a second avionics display that is configured to selectively operate as a multifunction display while said first avionics display operates as a primary flight display; and
    a communications connection linking said first and second avionics displays,
    wherein information is transmitted between said first and second avionics displays via said communications connection, and
    wherein said second avionics display operates as a back-up to said first avionics display by operating as a primary flight display if said first avionics display stops operating as a primary flight display during critical flight operations.

13. The electronic avionics system of claim 12, wherein said second flight display's transition from operating as a multi-function flight display to a primary flight display does not require pilot action.

14. The electronic avionics system of claim 12, wherein a critical flight operation is a flight operation for which regulations require an aircraft to have a back-up system for a primary flight display.

* * * * *